US010601892B2

(12) United States Patent
Deleuze et al.

(10) Patent No.: US 10,601,892 B2
(45) Date of Patent: Mar. 24, 2020

(54) COLLABORATIVE BOOKMARKS

(71) Applicant: International Business Machines Corporation, Armonk, NY (US)

(72) Inventors: Ivan Deleuze, Montpellier (FR); Marie-Helene Eve, Jacou (FR); Laurent Revel, Montpellier (FR)

(73) Assignee: International Business Machines Corporation, Armonk, NY (US)

( * ) Notice: Subject to any disclaimer, the term of this patent is extended or adjusted under 35 U.S.C. 154(b) by 804 days.

(21) Appl. No.: 14/922,705

(22) Filed: Oct. 26, 2015

(65) Prior Publication Data

US 2017/0116348 A1 Apr. 27, 2017

(51) Int. Cl.
G06F 7/00 (2006.01)
H04L 29/08 (2006.01)
G06F 16/955 (2019.01)

(52) U.S. Cl.
CPC .......... H04L 67/02 (2013.01); G06F 16/9562 (2019.01); *G06F 16/9566* (2019.01)

(58) Field of Classification Search
CPC .................................................. G06F 16/9566
USPC .......................................................... 707/769
See application file for complete search history.

(56) References Cited

U.S. PATENT DOCUMENTS

| | | | | |
|---|---|---|---|---|
| 6,427,175 B1 * | 7/2002 | Khan | ...................... | H04L 41/22 709/245 |
| 6,981,210 B2 * | 12/2005 | Peters | ................. | G06F 16/9562 715/234 |
| 7,526,472 B2 * | 4/2009 | Heidloff | .............. | G06F 16/9535 |
| 7,590,589 B2 * | 9/2009 | Hoffberg | .............. | G06Q 20/401 705/37 |
| 8,176,166 B2 * | 5/2012 | Hind | ................... | G06F 16/9562 709/224 |
| 8,442,961 B2 | 5/2013 | Ferri et al. | | |
| 9,075,777 B1 * | 7/2015 | Pope | ................... | G06F 17/2235 |
| 9,787,477 B1 * | 10/2017 | Singal | .................. | H04L 9/3268 |

(Continued)

FOREIGN PATENT DOCUMENTS

EP 2569750 11/2013

OTHER PUBLICATIONS

Method and system for reducing negative effects caused by invalid URLs, IP.com No. 000233311, IP.com Electronic Publication: Dec. 6, 2013, 5 pages.

(Continued)

*Primary Examiner* — Eliyah S. Harper
(74) *Attorney, Agent, or Firm* — Schmeiser, Olsen & Watts, LLP; Isaac Gooshaw (57) ABSTRACT

A method, system, and computer program product for operating a collaborative bookmarking system (CBS). A request is received from a client for a universal resource locator (URL) associated with an identifier, wherein the URL and the identifier make up a bookmark which has been previously shared with a community by a user. An alternative candidate URL for the requested URL is located, wherein the alternative candidate URL has previously been suggested to the CBS by the user as a replacement for an original URL. Client validation, by the client, of the alternative candidate URL is requested and received. The validated alternative candidate URL is associated with the identifier as part of the bookmark in place of the requested URL.

16 Claims, 6 Drawing Sheets

(56) References Cited

U.S. PATENT DOCUMENTS

| | | | | |
|---|---|---|---|---|
| 9,843,447 | B1* | 12/2017 | Bishop | H04L 63/1466 |
| 10,089,654 | B1* | 10/2018 | Chang | G06Q 30/0264 |
| 2003/0144984 | A1 | 7/2003 | Dunbar | |
| 2007/0233448 | A1* | 10/2007 | Papaefstathiou | G06F 17/5009 703/15 |
| 2012/0216102 | A1* | 8/2012 | Malla | G06F 17/241 715/206 |
| 2013/0159826 | A1* | 6/2013 | Mason | G06F 17/2247 715/205 |
| 2013/0339337 | A1* | 12/2013 | Alkhateeb | G06F 17/30864 707/710 |
| 2014/0237347 | A1 | 8/2014 | Jeyachandran | |
| 2015/0181415 | A1* | 6/2015 | Raleigh | H04W 8/22 455/418 |
| 2015/0227496 | A1* | 8/2015 | Liu | G06F 16/9535 715/205 |
| 2015/0370847 | A1* | 12/2015 | Kondoh | G06Q 10/06 707/691 |

OTHER PUBLICATIONS

Benz et al., Automatic Bookmark Classification: A Collaborative Approach, 2Fbenz_automatic.pdf&ei=hrNQVYCwl-XXywPFr4CgDg&usg=AFQjCNG5VPOWQ_6oK7EQwNl0mOz3gPVSFg&bvm=bv.92885102,d.bGQ Captured: May 11, 2015, 8 pages.

Pitsilis et al., Harnessing the power of Social Bookmarking for improving tag-based Recommendations, arXiv:1410.5072vl [cs.SI] Oct. 10, 2014, 28 pages.

Kanawati et al., A Multi-agent System for Collaborative Bookmarking, http:/lwww.google.co.uklurl?sa=t&rct=j&q=&esrc=s&source=web&cd=1&ved=OCCYQFjAA&url=http%3A%2F%iJ2Fceur-ws.org%2FVoi-59%D2F8Kanawati.pdf&ei=abRQVdz8G8PVyg0NtYG4AQ&usg=AFQjCNG-IWBoanwPPDreWx6VCI_1FyVBpw&bvm=bv.928851021,d.bGQo Captured: May 11, 2015, 14 pages.

* cited by examiner

FIG. 1

Collaborative Bookmarking Module 200

Request Buffer 202

Query Engine 204

Transmitter 206

Validation Buffer 208

Association Engine 210

Collaborative Bookmarking Method 400

FIG. 2

Collaborative Bookmarking Database 300A

| Group | Identifier | URL | Update URL | Old URL |
|---|---|---|---|---|
| Tail Group | tail | www.cat.co/c1 | | |
| Purr Group | purr | ~~www.cat.co/c1~~ | | |
| Cat Group | cats | ~~www.cat.co/c1~~ | www.cat.co/c2 | |
| Fur Group | fur | www.cat.co/c2 | | www.cat.co/c1 |

FIG. 3A

Collaborative Bookmarking Database 300B

| Client | Identifier | URL |
|---|---|---|
| A | tail | www.cat.co/c1 |
| B | purr | ~~www.cat.co/c1~~ |
| C | mycats | www.cat.co/c2 |

FIG. 3B

Collaborative Bookmarking Method 400

402 Start of method

404 Receiving, from a client, a request for a universal resource locator (URL) associated with a identifier

406 Locating at least one alternative candidate URL for the requested URL in a identifier URL database

408 Requesting the client validate one of the at least one candidate URLs over the requested URL. (Optionally sending validity reports)

410 Receiving validation of a candidate URL from the client

412 Associating the validated candidate URL with the identifier (and disassociating the requested URL with the client identifier)

414 Associating the validated candidate URL with other identifiers over the requested URL

416 End of method

COLLABORATIVE BOOKMARKS

TECHNICAL FIELD

The present invention relates to a method and apparatus for collaborative bookmarking.

BACKGROUND

Bookmarking associates a URL with an identifier (or name). For example, the URL might be www.ibm.com and the identifier (or name) that would appear in your bookmark list might be "IBM". A bookmark refers to a universal resource locator (URL) and a corresponding identifier typically stored as a hypertext markup link in a document or as a record in a database or as a file shortcut in a file system. Bookmarks are also known as Internet favorites or Internet shortcuts. An identifier can also be known as a label or a name.

It has become more and more common for a URL for a document to be shared with several members of a community, such as a group on a social network. In many cases, the URL of the document referred to by a bookmark is updated and the next time the bookmark is used there will be an error (because, for example, the document may be a file that is hosted in a database but the location of the database has changed).

A bookmark can exist for a long time in a Web browser bookmark list, because maintenance tends to be a low priority task. Bookmarks are a key feature to improve productivity and quickly find information that has already been located once on the Internet or on a private network such as an intranet. Bookmark management programs face several challenges: universal resource locators (URLs) are not as static as previously; links, images, and videos are increasingly stored on cloud hosted Web services; and increasingly people work and exchange information with a community.

SUMMARY

The present invention provides a method and system for operating a collaborative bookmarking system (CBS). One or more processors of a computer system receive, from a client, a request for a universal resource locator (URL) associated with an identifier, wherein the URL and the identifier make up a bookmark which has been previously shared with a community by a user. The one or more processors locate an alternative candidate URL for the requested URL, wherein the alternative candidate URL has previously been suggested to the CBS by the user as a replacement for an original URL. The one or more processors request client validation, by the client, of the alternative candidate URL. The one or more processors receive client validation, by the client, of the alternative candidate URL. The one or more processors associate the validated alternative candidate URL with the identifier as part of the bookmark in place of the requested URL.

BRIEF DESCRIPTION OF THE DRAWINGS

Embodiments of the present invention will be described, by way of example only, with reference to the following drawings.

DETAILED DESCRIPTION

Accuracy of stored universal resource locators (URLs) is a key point for productivity. It is frustrating to be faced with a Web page not found error (e.g., "404 URL not found" error). People who share URLs (such as Web masters, community managers, sales, school librarians, professors and researchers) would reduce the time and money wasted if the people who share URLs encountered fewer Web page not found errors.

The embodiments of the present invention ensure that if the URL has been updated and shared somewhere within a collaborative bookmarking system (CBS), then the URL will be available to any member of the CBS as a potential update candidate.

In one embodiment, a database comprises primary URL associations and potential alternative candidate URL associations.

In one embodiment, a validated alternative candidate URL is associated with other identifiers that are associated with an originally associated URL.

In one embodiment, the CBS comprises a plurality of URL lists, each URL list associated with a particular client and comprising URLs and associated identifiers.

Still more preferably the client is a user or another system.

In one embodiment, the candidate URL comprises a newer URL or a URL that has been verified as functioning.

In one embodiment, a validity report for the candidate URL is sent to the client, wherein the validity report contains a value representing a number of client validations for the candidate URL.

In one embodiment, a validity report for the requested URL is sent to the client, wherein the validity report contains a value based on a number of times a client has validated a candidate URL instead of the requested URL.

Figure 1:
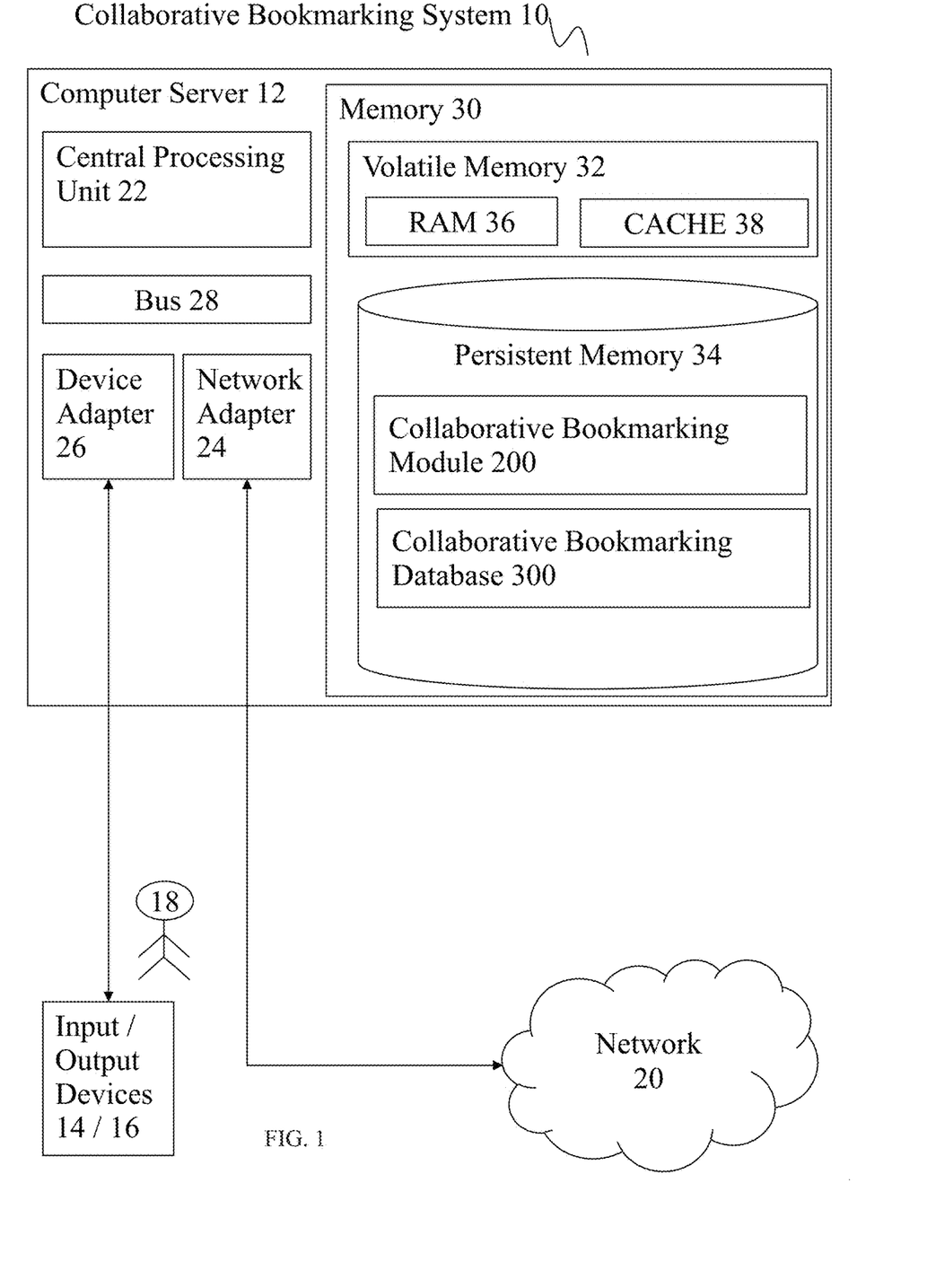
FIG. 1 is a diagram of a collaborative bookmarking system, in accordance with embodiments of the present invention.

Referring to FIG. 1, FIG. 1 is a diagram of a collaborative bookmarking system 10, in accordance with embodiments of the present invention. Collaborative bookmarking system 10 is operational with numerous other general purpose or special purpose computing system environments or configurations. Examples of well-known computing processing systems, environments, and/or configurations that may be suitable for use with collaborative bookmarking system 10 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices. A distributed computer environment includes a cloud computing environment, for example, where computer processing is a third party service performed by one or more computer processing systems. A distributed computer environment also includes an Internet computing environment, for example, where computer processing systems are distributed as a network of objects that can interact with a computing service.

Collaborative bookmarking system 10 may be utilized in the general context of computer system executable instructions, such as program modules, being executed by a computer processor. Generally, program modules may include routines, programs, objects, components, logic, and data structures that perform particular tasks or implement particular data types. Collaborative bookmarking system 10 may be embodied in distributed cloud computing environments where tasks are performed by remote processing devices that are linked through a communications network. In a distributed cloud computing environment, program modules may be located in both local and remote computer system storage media including memory storage devices.

Collaborative bookmarking system 10 includes: hardware computer server 12 and one or more input devices 14 and output devices 16 directly attached to the computer server 12. Collaborative bookmarking system 10 is connected to a network 20. Collaborative bookmarking system 10 communicates with a user 18 using input devices 14 and output devices 16. In one embodiment, input devices 14 include one or more of: a keyboard, a scanner, a mouse, trackball or another pointing device. In one embodiment, output devices 16 include one or more of a display or a printer. Collaborative bookmarking system 10 communicates with network devices (not shown) over network 20. In one embodiment, network 20 can be a local area network (LAN), a wide area network (WAN), or the Internet.

Computer server 12 includes: central processing unit (CPU) 22; network adapter 24; device adapter 26; bus 28; and memory 30.

CPU 22 loads machine instructions from memory 30 and performs machine operations in response to the instructions. Such machine operations include: incrementing or decrementing a value in a register; transferring a value from memory 30 to a register or vice versa; branching to a different locator in memory if a condition is true or false (also known as a conditional branch instruction); and adding or subtracting the values in two different registers and loading the result in another register. A typical CPU can perform many different machine operations. A set of machine instructions is called a machine code program. The machine instructions are written in a machine code language which is referred to a low level language. A computer program written in a high level language needs to be compiled to a machine code program before the computer program can be run. Alternatively a machine code program such as a virtual machine or an interpreter can interpret a high level language in terms of machine operations.

Network adapter 24 is connected to bus 28 and network 20 for enabling communication between the computer server 12 and network devices.

Device adapter 26 is connected to bus 28 and input devices 14 and output devices 16 for enabling communication between computer server 12 and input devices 14 and output devices 16.

Bus 28 couples the main system components together including memory 30 to CPU 22. Bus 28 represents one or more of any of several types of bus structures including: a memory bus or memory controller; a peripheral bus; an accelerated graphics port; and a processor or local bus using any of a variety of bus architectures. By way of example, without limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Examples of persistent memory 34 are read only memory (ROM) and erasable programmable read only memory (EPROM). Generally, volatile memory is used because volatile memory is faster than non-volatile memory. Non-volatile memory is used because non-volatile memory will hold the data longer than volatile memory. Collaborative bookmarking system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention.

Collaborative bookmarking module 200 is a program module that utilizes collaborative bookmarking database 300 to carry out the functions of embodiments of the invention. In one embodiment, ROM in the memory 30 stores module 200 that enables the computer server 12 to function as a special purpose computer specific to the module 200. Further program modules that support embodiments but are not shown include firmware, boot strap program(s), an operating system, and support applications. Each of the operating system; support applications; other program modules; and program data; or some combination thereof; may include an implementation of a networking environment.

Collaborative bookmarking system 10 communicates with at least one network 20 (such as a local area network (LAN), a general wide area network (WAN), and/or a public network like the Internet) via network adapter 24. Network adapter 24 communicates with the other components of computer server 12 via bus 28. It should be understood that although not shown, other hardware and/or software components could be used in conjunction with collaborative bookmarking system 10. Examples include, but are not limited to: microcode; device drivers; redundant processing units; external disk drive arrays; redundant array of independent disks (RAID); tape drives; and data archival storage systems.

Collaborative bookmarking module 200 is a component of the collaborative bookmarking system 10 and is described in detail below.

Collaborative bookmarking database 300 is a data structure for storing URLs and corresponding identifiers for the collaborative booking marking system 10 and is described in detail below. Although the term database is used, bookmarks can also be stored as links in a document and files in a file system.

Figure 2:
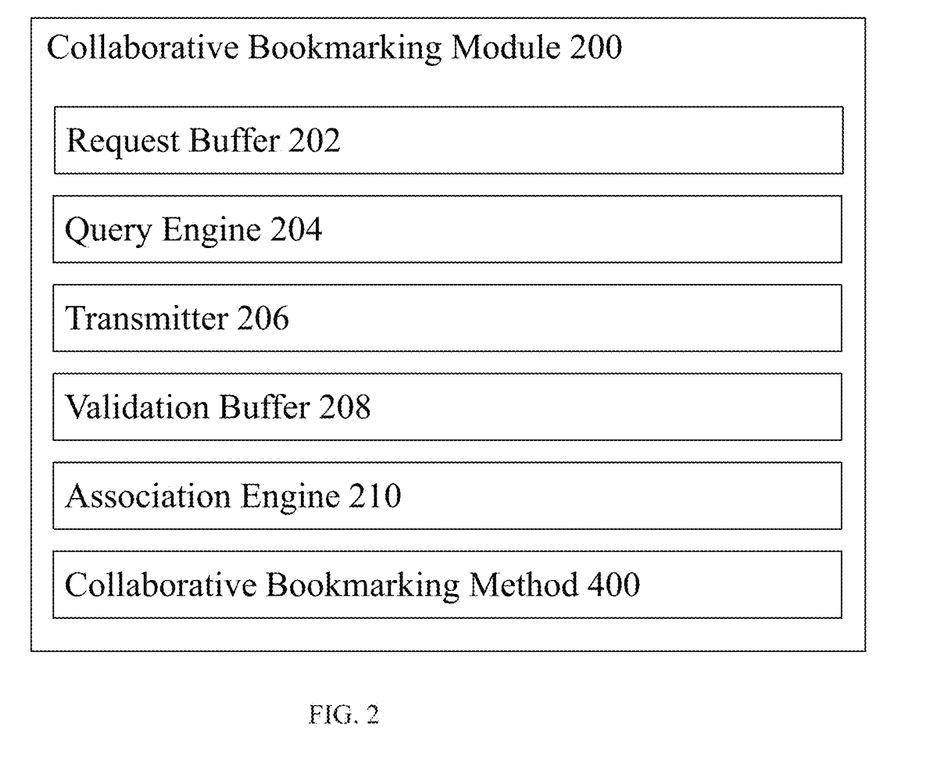
FIG. 2 is a diagram of a collaborative bookmarking module in the collaborative bookmarking system of FIG. 1, in accordance with embodiments of the present invention.

Referring to FIG. 2, FIG. 2 is a diagram of collaborative bookmarking module 200 of FIG. 1, in accordance with embodiments of the present invention. FIG. 2 includes the following components: request buffer 202; query engine 204; transmitter 206; validation buffer 208; association engine 210 and collaborative bookmarking method 400. In these embodiments component names are function names for a component that is for performing the stated function and the component can be any type of component or sub-components that are for performing the stated function.

Request buffer 202 is for receiving, from a client, a request for a universal resource locator (URL) associated with an identifier. The URL may be in a form of a hyperlink displayed on a bookmark page that performs a request when the bookmark page is selected. The identifier is a value that is associated with and therefore represents the URL for a client or a group.

Query engine 204 is for locating at least one alternative candidate URL for the requested URL in an identifier URL database. One type of search is for a new URL that has an associated old URL matching the requested URL. Referring to the example of FIG. 3A, such a search would locate www.cat.co/c2 when searching for old URL matching www.cat.co/c1.

Transmitter 206 is for requesting the client to validate one alternative candidate URL of the at least one alternative candidate URL instead of validating the requested URL.

Validation buffer 208 is for receiving validation of an alternative candidate URL from the client.

Association engine 210 is for associating the validated alternative candidate URL with the identifier (and disassociating the requested URL from the identifier). Association engine 210 is also for associating the validated alternative candidate URL with other identifiers instead of with the requested URL.

Collaborative bookmarking method 400 is for performing collaborative bookmarking according to embodiments of the present invention.

Figure 3A:
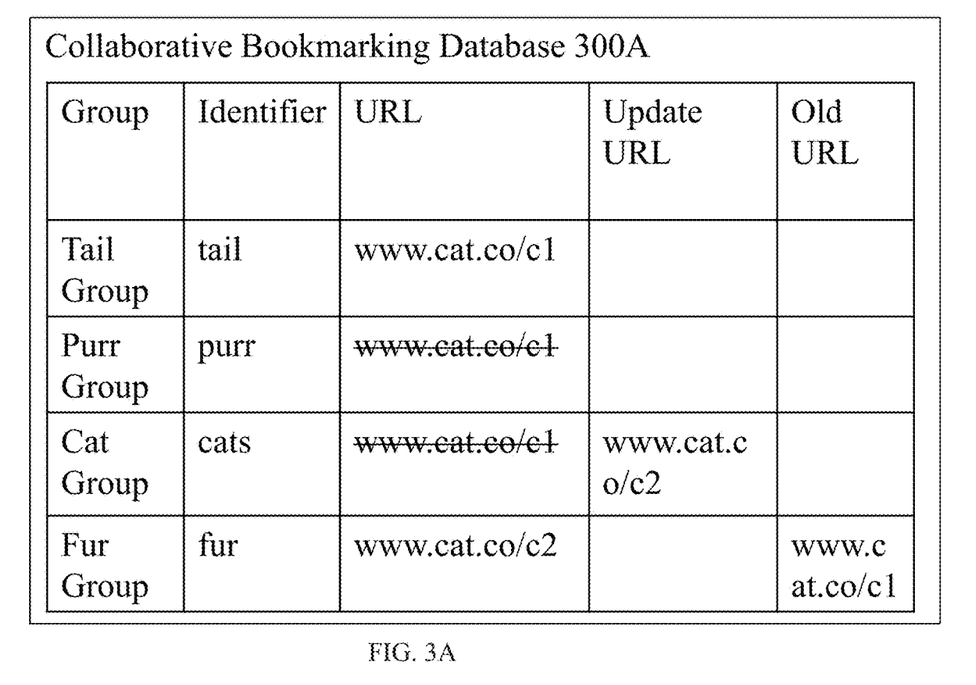
FIG. 3A is a diagram of a first collaborative bookmarking database in the collaborative bookmarking system of FIG. 1, in accordance with embodiments of the present invention.

FIG. 3A is a diagram of a collaborative bookmarking database 300A in the collaborative bookmarking system 10 of FIG. 1, in accordance with embodiments of the present invention. Collaborative bookmarking database 300 of FIG. 1 includes collaborative bookmarking database 300A according to embodiments for storing URLs and identifiers for collaborative bookmarking system 10. Collaborative bookmarking database 300A includes a table of records, in accordance with embodiments of the present invention, wherein the fields of the table include: group; identifier; URL; update URL; and old URL. An example is used below to describe the collaborative bookmarking database 300A. Each record in the example belongs to a group of agents. The groups of agents include: tail group; purr group; cat group and fur group. An agent is defined herein as software that runs in a background (i.e., without continuous direct supervision) to perform a function for an end user or other software. The tail group is identified by a record with an identifier of tail and a URL of "www.cat.co/c1" that points to a Web page depicting a tail (belonging to a cat in this example). The purr group is identified by a record with an identifier of purr and the same URL as in the preceding example (www.cat.co/c1) but in this case the URL is flagged as out-of-date (by a strikethrough line in this example). This out-of-date flag indicates that attempted navigation to the corresponding Web page will probably result in a Web page not found error from the Web server (e.g., a 404 error). The cat group is identified by a record with an identifier of cats and has the same flagged URL as in the preceding example but this time an updated URL (www.cat.co/c2) is listed. This updated URL is an example of a pending URL that has not been validated. The fur group is identified by a record with an identifier of fur, and the URL is listed as www.cat.co/c2 because the URL has been validated and www.cat.co/c1 is an old URL www.cat.co/c1 which may have been flagged as an old URL by any member of the purr group, cat group or fur group. The URL www.cat.co/c1 has not been flagged as an old URL in the tail group at this stage, because the tail group is not utilizing a feature that flags all out-of-date URLs in a bookmarking database.

Figure 3B:
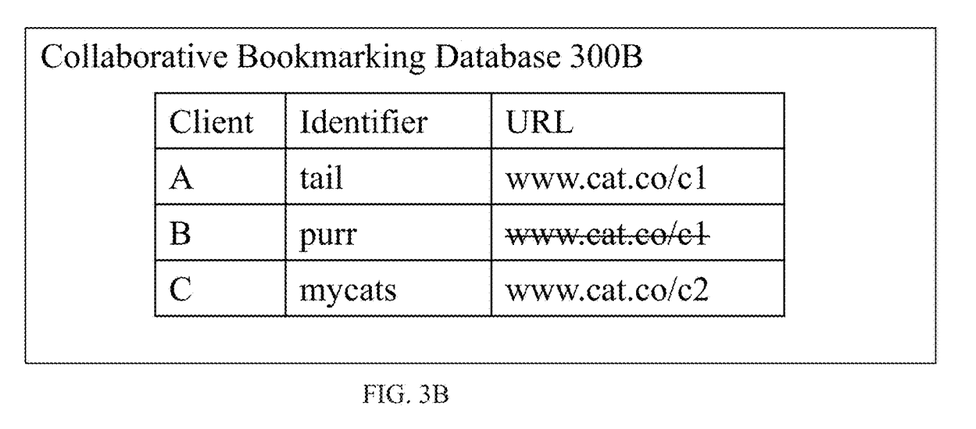
FIG. 3B is a diagram of a second collaborative bookmarking database in the collaborative bookmarking system of FIG. 1, in accordance with embodiments of the present invention.

FIG. 3A is a diagram of a collaborative bookmarking database 300B in the collaborative bookmarking system 10 of FIG. 1, in accordance with embodiments of the present invention. Collaborative bookmarking database 300 of FIG. 1 includes collaborative bookmarking database 300B according to alternative embodiments of the present invention for storing URLs and identifiers for a collaborative booking marking system. Collaborative bookmarking database 300B includes three fields: client (client name); identifier; and URL. The client field contains the client name (for example, three client names are A; B; and C). The identifier field contains an identifier of the URL that in the example of FIG. 3B are: tail; purr; and mycats for clients A, B, and C, respectively. The URL field contains the universal resource locator value (URL) and includes, in this example: www.cat.co/c1; a flagged as out-of-date version of www.cat.co/c1 (struck through); and the newer URL of www.cat.co/c2. In this alternative embodiment of FIG. 3B, out-of-date URLs and corresponding updated URLs are not stored in the collaborative bookmarking database 300, but in a separate index of out-of-date URLs and corresponding updated URLs.

Figure 4:
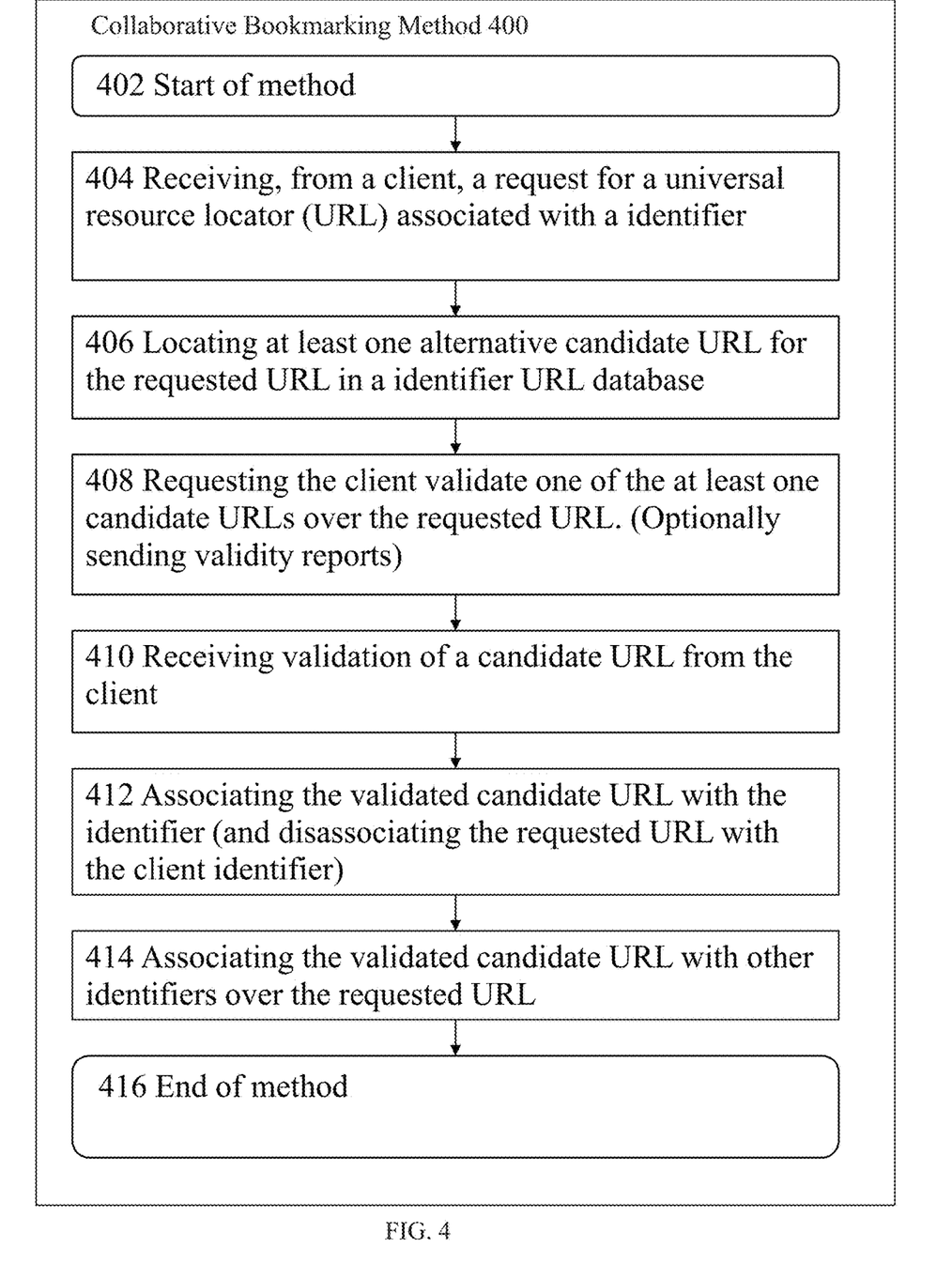
FIG. 4 is a flow diagram of a collaborative bookmarking method, in accordance with embodiments of the present invention.

FIG. 4 is a flow diagram of a collaborative bookmarking method, in accordance with embodiments of the present invention. Collaborative$_{[41]}$ bookmarking method 400 comprises logical process steps 402 to 416, in accordance with embodiments of the present invention. Although there is an order in FIG. 4 to the steps as described, the steps may not necessarily need to be in this order and in other embodiments, the steps can be in a different order.

Step 402 is the start of the method.

Step 404 is for receiving, from a client, a request for a URL associated with an identifier, which may occur, for example, when a first user of a social network is clicking on a bookmark that has been previously shared with the social network by a second user of the social network.

Step 406 is for locating an alternative candidate URL for the requested URL in an identifier URL database. This occurs, for example, when the second user has noticed that the original URL that the second user first shared with the social network has changed, and the document that the second user wants other users to see is now located elsewhere, and the second user has provided to the collaborative bookmarking system (CBS) the new URL (which points to the new location). This new URL is called an alternative candidate URL because the new URL is not actually accepted as the new URL until another user of the social network has validated the alternative candidate URL as the new URL. It is also possible that more than one alternative candidate URLs are located in step 406.

Step 408 is for requesting the client to validate the alternative candidate URL as being a valid replacement for the requested URL. Optionally, step 408 is also for sending to the client a validity report for the candidate URL, wherein the validity report contains a value representing the number of client validations and/or contains a value based on the number of times a client has validated a candidate URL.

Step 410 is for receiving validation of a candidate URL from the client.

Step 412 is for associating the validated candidate URL with the identifier (and disassociating the requested URL from the identifier).

Step 414 is for associating the validated candidate URL with other identifiers, which occurs, for example, when other bookmarks that have been shared to the social network also have the old URL, and so those other bookmarks need to have the URLs changed as well.

Step 416 is the end of the method.

Figure 5:
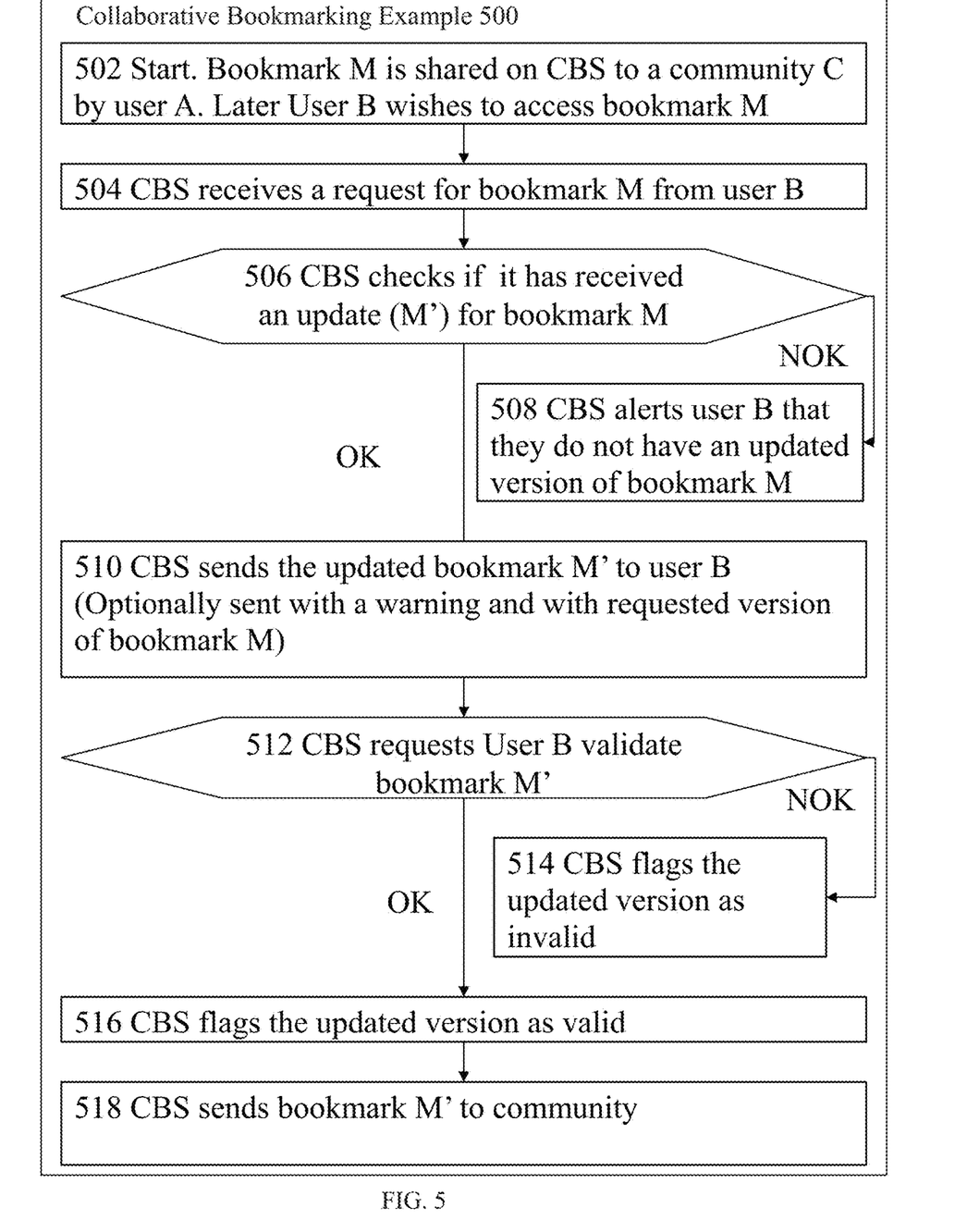
FIG. 5 is an example flow diagram of a collaborative bookmarking example, in accordance with embodiments of the present invention.

Referring to FIG. 5, an example flow diagram of a collaborative[A2] bookmarking example 500 is shown, in accordance with embodiments of the present invention. Collaborative bookmarking example 500 is described from the perspective of the CBS according to steps 502 to 518.

In step 502, the start of the method, bookmark M (having a URL of www.cat.co/c1) is shared on the CBS to a community C by user A.

Later, user B wishes to access bookmark M, and accordingly, in step 504, the CBS receives a request for bookmark M from user B (see step 404).

In step 506, the CBS checks if the CBS has received an update (for example, bookmark M'=www.cat.co/c2) for bookmark M (see step 406). Such a check is performed over the entire collaborative bookmark database 300. If step 506 determines that the CBS has received an update for bookmark M (OK) then step 510 is next executed; otherwise (NOK; i.e., not OK) step 508 is next executed.

In step 508, the CBS alerts user B that there is no updated version of bookmark M. The example ends upon execution of step 508.

In step 510, the CBS sends the updated bookmark M' to user B (see step 408). The updated bookmark M' contains an alternative candidate URL. Optionally, the updated bookmark M' is sent with a warning and with the requested version of bookmark M.

In step 512, the CBS requests user B to validate bookmark M' (see steps 408 and step 410). In step 512, user B follows the link of the alternative candidate URL and determines whether the document is the correct document that the user expected to see. If step 512 determines that user B has validated bookmark M' (OK) then step 516 is next executed; otherwise (NOK) step 514 is next executed.

In step 514, the CBS flags the updated bookmark M' as invalid which ends the example.

In step 516, the CBS flags the updated bookmark M' as valid (see step 412) which means that user B has indicated that the content of the document pointed to by the URL in the bookmark M' is correct.

In step 518, the CBS sends bookmark M' to the community (see also step 414), so that when other users of the community click on the bookmark M', the other users of the community will be directed to the correct location of the document pointed to by the URL in the bookmark M'.

Figure 6:
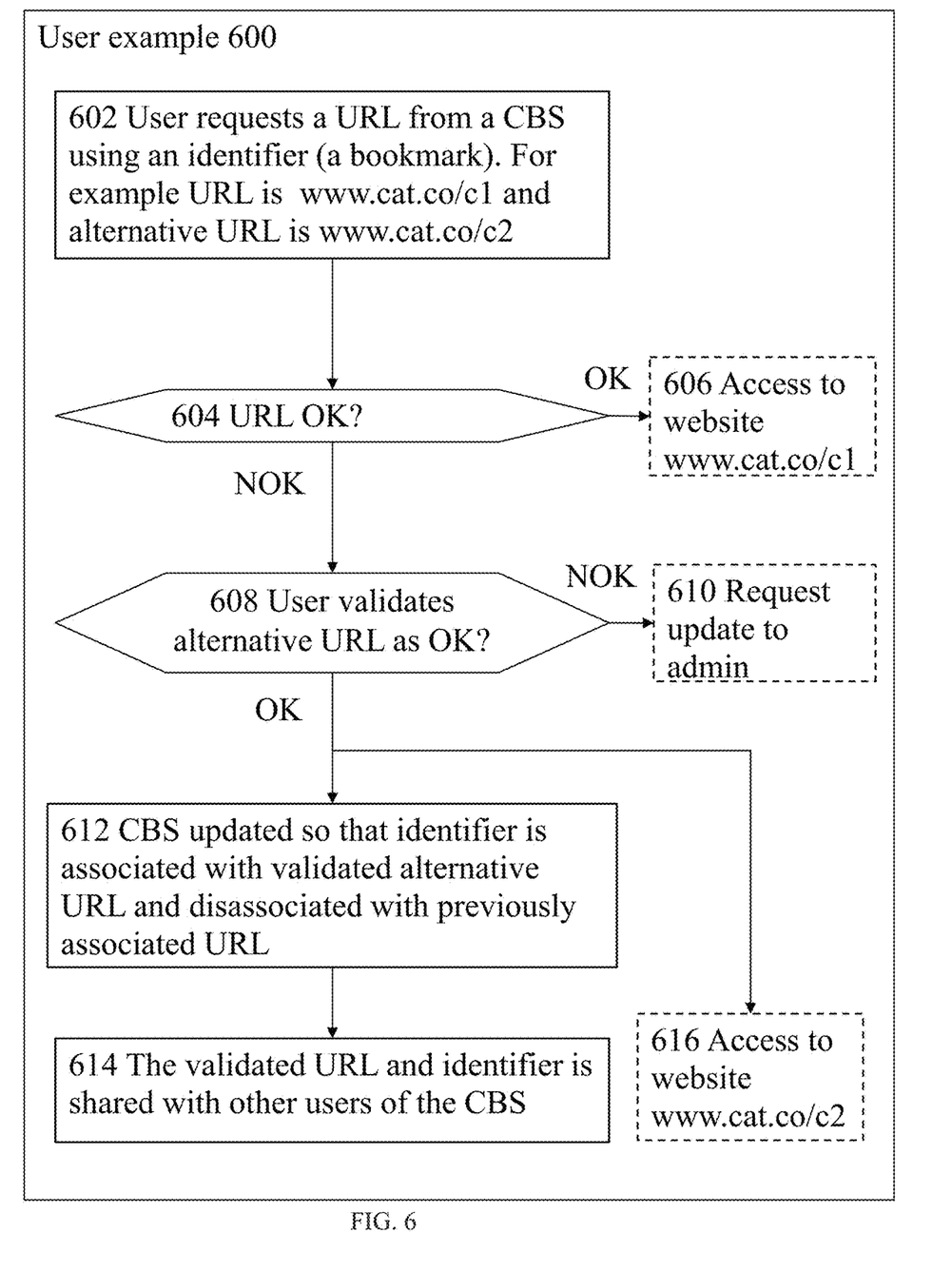
FIG. 6 is an example flow diagram of a user example, in accordance with embodiments of the present invention.

FIG. 6 is an example flow diagram of a user example, in accordance with embodiments of the present invention. The example of FIG. 6 is described from the perspective of the client (e.g., a user) according to steps 602 to 616.

In step 602, a user of a community requests a URL by clicking on a bookmark which has previously been shared with the community by another user of the community. For example, when the identifier is CATS, a URL www.cat.co/c1 and an alternative URL www.cat.co/c2 are returned (i.e., sent back) to the user by the CBS. As part of the user request, an attempt to navigate to the returned URL is made.

In step 604, the URL returned by the CBS (www.cat.co./c1) is tested. In one example, the test is not okay (NOK) as no web page is found at the tested URL and the example proceeds at step 608. However, in another example where the URL at the tested URL returns an expected web page, then the test is okay (OK) and step 606 is next executed.

In step 606, the user gets access to the Web page (at URL www.cat.co./c1) and that is the end of the example.

In step 608, the URL does not take the user to the correct location of the requested document and so the alternative URL (e.g., which had previously been suggested by another user) is presented to the user and requests that the user validate the alternative URL instead of the originally associated URL. For example, the request can be in the form of a user input question associated with a plain URL or with a snapshot of the web page of the URL or with an actual web page. The request could be "Do you validate www.cat.co/c2 instead of www.cat.co/c1 for the bookmark CATS?". The user can select a binary answer of yes or no to validate. Alternatively, more than one alternative URL can be presented in a check box list and the user is requested to validate one alternative URL by selecting a checkbox associated with the one alternative URL that the user considers valid. In this example, the user is able to correct the example (OK) and steps 612 and 616 are subsequently executed. However, in another example the user cannot validate an alternative URL (NOK) and step 610 is next executed.

In step 610, a request is sent to an administrator to update the link, which ends this example.

In step 612, the identifier in the CBS is updated to the validated alternative URL (www.cat.co/c2). The updating associates the identifier with the validated alternative URL and disassociates the identifier from the originally associated URL.

In step 614, the updated identifier (www.cat.co/c2) is shared with other users in the CBS as an alternative candidate for replacing similarly out-of-date identifiers that link to the out-of-date URL www.cat.co/c1.

In step 616, the user is given access to the validated URL www.cat.co/c2.

This is the end of this user example 600.

Further embodiments of the invention are now described. It will be clear to one of ordinary skill in the art that all or part of the logical process steps of embodiments of the present invention may be alternatively embodied in a logic apparatus, or a plurality of logic apparatuses, comprising logic elements arranged to perform the logical process steps of the method and that such logic elements may comprise hardware components, firmware components or a combination thereof.

It will be equally clear to one of skill in the art that all or part of the logic components of the embodiments of the present invention may be alternatively embodied in logic apparatuses comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using; for example, a virtual hardware descriptor language, which may be stored and transmitted using fixed or transmittable carrier media.

In a further alternative embodiment, the present invention may be realized in the form of a computer implemented method of deploying a service, comprising steps of deploying computer program code operable to, when deployed into a computer infrastructure and executed thereon, cause the computer system to perform all the steps of the method.

It will be appreciated that the method and components of embodiments of the present invention may alternatively be embodied fully or partially in a parallel computing system comprising two or more processors for executing parallel software.

A further embodiment of the present invention is a computer program product defined in terms of a system and method. The computer program product may include a computer-readable storage medium (or media) having computer-readable program instructions thereon for causing a processor to carry out aspects of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code containing instructions executable by one or more processors to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for operating a collaborative bookmarking system (CBS) to receive an alternate universal resource locator (URL) and share the received alternate URL with users of a community, said method comprising:
   receiving, by one or more processors of a computer system, from a client, a request for an original universal resource locator (URL) associated with an identifier representing the requested URL, wherein the original URL and the identifier make up a bookmark which has been previously shared with the community by a user of the community;
   said one or more processors activating a search of an identifier URL database in the CBS to locate the original URL and receiving from the search an alternative candidate URL for the original URL, wherein the alternative candidate URL differs from the original URL and has previously been suggested to the CBS by the user as a replacement for the original URL;
   said one or more processors requesting client validation, by the client, of the alternative candidate URL;
   said one or more processors receiving client validation, by the client, of the alternative candidate URL;
   said one or more processors associating the validated alternative candidate URL with the identifier as part of the bookmark in place of the requested URL and dissociating the original URL from the identifier;
   said one or more processors sharing the validated alternative candidate URL with other users of the community; and
   said one or more processors sending to the client at least one validity report, wherein the at least one validity report is selected from the group consisting of a validity report for the alternative candidate URL, a validity report for the requested URL, and a combination thereof, wherein the validity report for the alternative candidate URL contains a value representing a number of client validations for the alternative candidate URL, and wherein the validity report for the requested URL contains a value based on a number of times a client has validated a candidate URL for replacing the requested URL.

2. The method of claim 1, said method further comprising:
   said one or more processors associating the validated alternative candidate URL with another identifier representing the alternative candidate URL.

3. The method of claim 1, wherein the identifier URL database in the CBS comprises a plurality of URL lists, each URL list associated with a particular client and comprising URLs and associated identifiers.

4. The method of claim 1, wherein the client is a user of the CBS or a user of another system.

5. The method of claim 1, wherein the alternative candidate URL comprises a URL that is newer than the original URL.

6. A computer program product, comprising one or more computer readable hardware storage devices having computer readable program code stored therein, said program code containing instructions executable by one or more processors of a computer system to implement a method for operating a collaborative bookmarking system (CBS) to receive an alternate universal resource locator (URL) and share the received alternate URL with users of a community, said method comprising:
   said one or more processors receiving, from a client, a request for an original universal resource locator (URL) associated with an identifier representing the requested URL, wherein the original URL and the identifier make up a bookmark which has been previously shared with the community by a user of the community;
   said one or more processors activating a search of an identifier URL database in the CBS to locate the original URL and receiving from the search an alternative candidate URL for the original URL, wherein the alternative candidate URL differs from the original URL and has previously been suggested to the CBS by the user as a replacement for the original URL;
   said one or more processors requesting client validation, by the client, of the alternative candidate URL;
   said one or more processors receiving client validation, by the client, of the alternative candidate URL;
   said one or more processors associating the validated alternative candidate URL with the identifier as part of the bookmark in place of the requested URL and dissociating the original URL from the identifier;
   said one or more processors sharing the validated alternative candidate URL with other users of the community; and
   said one or more processors sending to the client at least one validity report, wherein the at least one validity report is selected from the group consisting of a validity report for the alternative candidate URL, a validity report for the requested URL, and a combination thereof, wherein the validity report for the alternative candidate URL contains a value representing a number of client validations for the alternative candidate URL, and wherein the validity report for the requested URL contains a value based on a number of times a client has validated a candidate URL for replacing the requested URL.

7. The computer program product of claim 6, said method further comprising:
said one or more processors associating the validated alternative candidate URL with another identifier representing the alternative candidate URL.

8. The computer program product of claim 6, wherein the identifier URL database in the CBS comprises a plurality of URL lists, each URL list associated with a particular client and comprising URLs and associated identifiers.

9. The computer program product of claim 6, wherein the client is a user of the CBS or a user of another system.

10. The computer program product of claim 6, wherein the alternative candidate URL comprises a URL that is newer than the original URL.

11. A computer system, comprising one or more processors, one or more memories, and one or more computer readable hardware storage devices, said one or more hardware storage device containing program code executable by the one or more processors via the one or more memories to implement a method for operating a collaborative bookmarking system (CBS) to receive an alternate universal resource locator (URL) and share the received alternate URL with users of a community, said method comprising:
said one or more processors receiving, from a client, a request for an original universal resource locator (URL) associated with an identifier representing the requested URL, wherein the original URL and the identifier make up a bookmark which has been previously shared with the community by a user of the community;
said one or more processors activating a search of an identifier URL database in the CBS to locate the original URL and receiving from the search an alternative candidate URL for the original URL, wherein the alternative candidate URL differs from the original URL and has previously been suggested to the CBS by the user as a replacement for the original URL;
said one or more processors requesting client validation, by the client, of the alternative candidate URL;
said one or more processors receiving client validation, by the client, of the alternative candidate URL;
said one or more processors associating the validated alternative candidate URL with the identifier as part of the bookmark in place of the requested URL and dissociating the original URL from the identifier;
said one or more processors sharing the validated alternative candidate URL with other users of the community; and
said one or more processors sending to the client at least one validity report, wherein the at least one validity report is selected from the group consisting of a validity report for the alternative candidate URL, a validity report for the requested URL, and a combination thereof, wherein the validity report for the alternative candidate URL contains a value representing a number of client validations for the alternative candidate URL, and wherein the validity report for the requested URL contains a value based on a number of times a client has validated a candidate URL for replacing the requested URL.

12. The computer system of claim 11, said method further comprising:
said one or more processors associating the validated alternative candidate URL with another identifier representing the alternative candidate URL.

13. The computer system of claim 11, wherein the identifier URL database in the CBS comprises a plurality of URL lists, each URL list associated with a particular client and comprising URLs and associated identifiers.

14. The computer system of claim 11, wherein the client is a user of the CBS or a user of another system.

15. The computer system of claim 11, wherein the alternative candidate URL comprises a URL that is newer than the original URL.

16. The method of claim 1, wherein the identifier associated and representing the requested URL identifies a group of agents, each agent being software that runs in a background, without continuous direct supervision, to perform a function for an end user or other software.

* * * * *